Patented Sept. 24, 1929

1,729,590

UNITED STATES PATENT OFFICE

ALFRED OWEN MORRIS, OF LIVERPOOL, ENGLAND

MANUFACTURE OF MEAL FOR USE IN CONNECTION WITH SAUSAGE MEAT, MEAT AND FISH PASTE, AND THE LIKE

No Drawing.   Application filed March 18, 1926.   Serial No. 95,786.

This invention has reference to the manufacture of meal for use in connection with sausage meat, meat and fish paste, and the like.

Meals of the kind herein concerned are used in minced or finely chopped meats such as are used in sausages, meat and fish pastes, and the like, for binding the material and to hold and retain the natural juices and moisture in it, and in some cases the meal is coloured for the purpose of imparting to the sausage meat, or the like, a pleasing or appetizing appearance.

It has been found, however, that such coloured meals when mixed with the meat, paste, or the like, as the case may be, are unsatisfactory, for one reason that the meat or article containing the coloured or tinted meal, shows spots or blotches of relatively highly coloured pink or red, which gives to the meat or food a spotty or speckled, and therefore objectionable appearance; and the primary object and effect of this invention is to provide a meal which will not have these defects and objections; that is to say, to provide a meal of the kind concerned which will impart to the meat a uniform tinted pleasing and appetizing appearance.

In the method of preparing the meal hereinafter described, the improvements according to this invention are comprised.

In the manufacture of the meal material, a certain quantity of starch, preferably maize starch, is used, and this quantity of starch is first coloured by dissolving a quantity of colour in a relatively large quantity of water, and then applying it to the starch by spraying it evenly on to it, the effect being that the starch absorbs it, and it is uniformly distributed in it, the starch thus becoming a moistened mass; and then this starch is dried to the degree in which the surplus moisture is driven off, and sieved, resulting in a dry powdery compound; and a small quantity of this dry tinted or coloured starch is added to and mixed with a relatively large quantity of any suitable flour, or like cereal material, cornflour being preferred; and this product constitutes the commercial article for use in connection with the meats, fish pastes or the like, with which it can be mixed to the required degree for producing the effects or results specified.

By means of this method of manufacturing the meal, in which starch is utilized as a vehicle or means for receiving, and distributing by spraying the colouring matter (preferably pink colouring matter) on it as described, the defects or objections above referred to, viz, spotting or blotching of the food products, is avoided, the production of a meal which is generally beneficial and satisfactory is accomplished.

As an example of the method of making the product or article, 1 ounce of a suitable dry pink colour may be dissolved in a gallon of warm water and filtered; and this solution is then distributed to say about 40 lbs. of the starch by a fine spray which uniformly tints and moistens it, and this coloured dried starch is added to and mixed with the bulk or body of the meal to be produced, namely, flour, as cornflour, to the extent of about one to two per cent of the former to the latter; and this compound constitutes the completed article of commerce.

From the above it will be seen only a very small quantity of dye is used in the meat, which is desirable.

In spraying or atomizing the coloured solution to the starch, the latter may be spread out to promote even distribution, while being turned over or mixed in a mixing machine.

Regarding the colour used, this preferably is an aniline dye of high purity, such as is now used in food.

In cases where the meal is to be used in connection with sausages which after cooking have to be sliced, it is desirable, to enable this slicing to be well done and without crumbling, that a certain amount of glutin or the like should be contained in the meal, and this quantity can be furnished by using a flour containing glutin, such as wheat flour; but in other cases such as using it in ordinary sausages, flour containing no glutin, such as cornflour, should be used, as a flour with glutin introduces difficulties in the working of the meat in the skin filling machine, and in the filling of the meat into the skins.

What is claimed is:—

The method of making an evenly colored or tinted meal for use in connection with sausage meat, meat, fish paste, and the like, consisting in spraying a tinted liquid onto starch to cause the starch to absorb the liquid and be evenly colored thereby, driving off the moisture of the colored starch, sieving the product to obtain a dry powdery mass, and finally mixing a relatively small quantity of this dry powdery colored product with flour to provide an evenly colored meal for the use described.

In testimony whereof I have signed my name to this specification.

ALF. O. MORRIS.